United States Patent
Pender

(10) Patent No.: US 8,329,788 B2
(45) Date of Patent: Dec. 11, 2012

(54) TIRE HAVING ENHANCED OZONE RESISTANCE

(75) Inventor: Mark J. Pender, Mauldin, SC (US)

(73) Assignee: Michelin Recherche et Technique S.A. (CH)

( * ) Notice: Subject to any disclaimer, the term of this patent is extended or adjusted under 35 U.S.C. 154(b) by 116 days.

(21) Appl. No.: 12/679,990

(22) PCT Filed: Mar. 31, 2008

(86) PCT No.: PCT/US2008/058903
§ 371 (c)(1), (2), (4) Date: Jun. 23, 2010

(87) PCT Pub. No.: WO2009/123611
PCT Pub. Date: Oct. 8, 2009

(65) Prior Publication Data
US 2010/0319824 A1    Dec. 23, 2010

(51) Int. Cl.
*C08K 5/34* (2006.01)
*B60C 1/00* (2006.01)

(52) U.S. Cl. .................................. 524/100; 152/151

(58) Field of Classification Search .................... 524/100
See application file for complete search history.

(56) References Cited

U.S. PATENT DOCUMENTS

| 4,324,710 A | * | 4/1982 | Davis et al. | 524/76 |
| 5,208,280 A | * | 5/1993 | Wheeler | 524/100 |
| 6,828,391 B2 | * | 12/2004 | Burkhart et al. | 525/502 |
| 7,572,850 B2 | * | 8/2009 | Hetzel et al. | 524/254 |

OTHER PUBLICATIONS

International Search Report and Written Opinion for PCT/US08/58903 dated Jul. 7, 2008.

* cited by examiner

*Primary Examiner* — Hui Chin
(74) *Attorney, Agent, or Firm* — Carolyn Uldrick

(57) ABSTRACT

The present invention includes rubber compositions, rubber articles and tires formulated to prevent ozone attack. A particular embodiment of the present invention includes a tire comprising a rubber structure, the rubber structure comprising an essentially unsaturated rubber elastomer, between 0.1 and 0.45 phr (parts by weight per hundred parts by weight of the rubber elastomer) of a particular compound 2,4,6-Tris-(N-1,4-dimethylpentyl-p-phenylenediamino)-1,3,5-triazine and between 0.5 and 2 phr of a phenolic resin.

26 Claims, No Drawings

TIRE HAVING ENHANCED OZONE RESISTANCE

BACKGROUND OF THE INVENTION

1. Field of the Invention

This invention relates generally to rubber materials and more specifically, to rubber materials and/or articles having enhanced ozone resistance.

2. Description of the Related Art

Ozone is known to have a detrimental effect on rubber articles such as windshield wiper blades, tires, seals and gaskets. Ozone attack typically occurs at the surface of the article causing frosting and/or cracking. Rubber articles may be formulated with one or more antiozonants to prevent these effects by, for example, working as scavengers, forming a protective film and/or reacting with double bonds and ionized rubber.

SUMMARY OF THE INVENTION

The present invention includes rubber compositions, rubber articles and tires formulated to prevent ozone attack. A particular embodiment of the present invention includes a tire comprising a rubber structure, the rubber structure comprising an essentially unsaturated rubber elastomer, between 0.1 and 0.45 phr (parts by weight per hundred parts by weight of the rubber elastomer) of a particular compound 2,4,6-Tris-(N-1,4-dimethylpentyl-p-phenylenediamino)-1,3,5-triazine and between 0.5 and 2 phr of a phenolic resin.

Particular embodiments of the present invention may further include an essentially unsaturated rubber elastomer that is highly unsaturated. The highly unsaturated rubber elastomer may be selected, for example, from polybutadiene, polyisoprenes, natural rubber, butadiene copolymers, isoprene copolymers or mixtures thereof.

Other embodiments of the present invention include a rubber article comprising an essentially unsaturated rubber elastomer, between 0.1 and 0.45 phr (parts per hundred of rubber) of a particular compound 2,4,6-Tris-(N-1,4-dimethylpentyl-p-phenylenediamino)-1,3,5-triazine and between 0.5 and 2 phr of a phenolic resin.

Another embodiment of the present invention includes a rubber composition comprising an essentially unsaturated rubber elastomer, between 0.1 and 0.45 phr (parts per hundred of rubber) of a particular compound 2,4,6-Tris-(N-1,4-dimethylpentyl-p-phenylenediamino)-1,3,5-triazine and between 0.5 and 2 phr of a phenolic resin.

The foregoing and other objects, features and advantages of the invention will be apparent from the following more detailed descriptions of particular embodiments of the invention.

DETAILED DESCRIPTION OF PARTICULAR EMBODIMENTS

The present invention provides rubber compositions and products made therefrom that provide favorable protection against ozone attack. Such compounds and products include a phenolic resin and low concentrations of a particular compound 2,4,6-Tris-(N-1,4-dimethylpentyl-p-phenylenediamino)-1,3,5-triazine. Rubber compositions having such properties are particularly suited for use in tires and especially for use in those parts of a tire such as the sidewall that are regularly exposed to the atmosphere.

Particular embodiments of the present invention include the particular compound, 2,4,6-Tris-(N-1,4-dimethylpentyl-p-phenylenediamino)-1,3,5-triazine commercially available under the trade name DURAZONE 37 from Chemtura. DURAZONE 37 is sold by Chemtura to provide antiozonant and antioxidant protection at recommended levels of 2 to 4 phr. The inventor has discovered that the combination of a phenolic resin and a very low concentration, which is less than the manufacturer's recommendation, of DURAZONE 37 provides adequate antiozonant protection.

Particular embodiments of the present invention therefore include articles, such as a tire, having one or more parts formed of a rubber composition having favorable resistance to ozone attack. Such rubber compositions may include an essentially unsaturated rubber elastomer, between 0.1 and 0.45 phr of the particular compound 2,4,6-Tris-(N-1,4-dimethylpentyl-p-phenylenediamino)-1,3,5-triazine and between 0.5 and 2 phr of a phenolic resin. Other embodiments may include the particular compound in an amount of between 0.2 and 0.45 phr, or in an amount of between 0.3 and 0.45 phr. Other embodiments may include the phenolic resin in an amount of between 0.5 and 1.0 phr.

The rubber elastomers included in particular embodiments are essentially unsaturated diene elastomers. Diene elastomers or rubber is understood to mean those elastomers resulting at least in part (i.e., a homopolymer or a copolymer) from diene monomers (monomers bearing two double carbon-carbon bonds, whether conjugated or not). Essentially unsaturated diene elastomers are understood to mean those diene elastomers that result at least in part from conjugated diene monomers, having a content of members or units of diene origin (conjugated dienes) that are greater than 15 mol. %. an essentially unsaturated rubber elastomer Thus, for example, diene elastomers such as butyl rubbers, nitrile rubbers or copolymers of dienes and of alpha-olefins of the ethylene-propylene diene terpolymer (EPDM) type or the ethylene-vinyl acetate copolymer type do not fall within the preceding definition, and may in particular be described as "essentially saturated" diene elastomers (low or very low content of units of diene origin, i.e., less than 15 mol. %. Particular embodiments of the present invention may include no essentially saturated diene elastomers.

Within the category of essentially unsaturated diene elastomers are the highly unsaturated diene elastomers, which are understood to mean in particular diene elastomers having a content of units of diene origin (conjugated dienes) that is greater than 50 mol. %.

The rubber elastomers suitable for use with particular embodiments of the present invention include highly unsaturated diene elastomers, for example, polybutadienes (BR), polyisoprenes (IR), natural rubber (NR), butadiene copolymers, isoprene copolymers and mixtures of these elastomers.

Also suitable for use in particular embodiments of the present invention are rubber elastomers that are copolymers and include, for example, butadiene-styrene copolymers (SBR), butadiene-isoprene copolymers (BIR), isoprene-styrene copolymers (SIR) and isoprene-butadiene-styrene copolymers (SBIR), mixtures thereof and/or with other essentially unsaturated and/or highly unsaturated rubber elastomers.

Also suitable for use in particular embodiments of the present invention are rubber elastomers that include, for example, natural rubber, synthetic cis-1,4 polyisoprenes and mixtures thereof and/or with other essentially unsaturated and/or highly unsaturated rubber elastomers. These synthetic cis-1,4 polyisoprenes may be characterized as possessing cis-1,4 bonds at more than 90 mol. % or alternatively, at more than 98 mol. %.

It should be noted that any of the essentially unsaturated and/or highly unsaturated elastomers may be utilized in particular embodiments as a functionalized elastomer. These elastomers can be functionalized by reacting them with suitable functionalizing agents prior to or in lieu of terminating the elastomer. Exemplary functionalizing agents include, but are not limited to, metal halides, metalloid halides, alkoxysilanes, imine-containing compounds, esters, ester-carboxylate metal complexes, alkyl ester carboxylase metal complexes, aldehydes or ketones, amides, isocyanates, isothiocyanates, imines, and epoxides. These types of functionalized elastomers are known to those of ordinary skill in the art. While particular embodiments may include one or more of these functionalized elastomers, other embodiments may include one or more of these functionalized elastomers mixed with one or more of the non-functionalized essentially unsaturated and/or highly unsaturated elastomers.

As disclosed above, it is the combination in a rubber composition of a low concentration of the compound 2,4,6-Tris-(N-1,4-dimethylpentyl-p-phenylenediamino)-1,3,5-triazine with the phenolic resin that provides the highly effective ozone resistance to the articles having such rubber compositions. A particular embodiment of the rubber composition according to the present invention includes a phenolic resin such as, for example, an octyl phenolic resin. A suitable resin for use in the present invention is, for example, commercially available under the trade name HRJ-2765 from SI Group.

Examples of other suitable resins are Ribetak R7521, SP-1068, SPF-117 from SI Group and 19900, 30900, 29095 from DUREZ and KPT-S15 from Kolon Chemical.

Phenolic resins are the condensation products of aldehydes and phenols. The family of phenolic resins includes, for example, novolak phenolic resin, resol phenolic resin, novolak alkylphenolic resin, resol alkylphenolic resin, and furan resin. These resins are used as adhesives, casting resins, potting compounds and laminating resins. In particular embodiments of the present invention an alkylphenolic resin may be used as a plasticizer and tackifier with the elastomers.

Particular embodiments of the present invention may further include within an uncured rubber composition other components such as, for example, reinforcing fillers, coupling agents, plasticizers, various processing aids, oil extenders, antidegradants, or combinations thereof as known to those having ordinary skill in the art. Suitable fillers include carbon black as well as inorganic fillers ("white fillers") such as silica, alumina, aluminum hydroxide, clays, calcium carbonate, glass fibers, microspheres, polymeric fibers such as polyester, nylon, or aramid fibers. Selection of these materials and the quantities of these materials to use are dependent on the elastomers used and the final application of the rubber composition and are easily selected by one having ordinary skill in the art.

The elastomer compositions disclosed herein may be used for various elastomeric products such as a tread compound, undertread compound, sidewall compound, wire skim compound, inner liner compound, bead, apex, any compound used in a tire carcass, including carcass reinforcement and in other components for tires, industrial rubber products, seals, timing belts, power transmission belting, and other rubber goods. As such, the present invention includes products made from the rubber compositions disclosed herein.

A tire includes many different structures including, for example, the tread, the sidewall, the undertread, inner liner, bead, apex and tire carcass. The rubber composition of the present invention is particularly suited for use in tire sidewalls that are exposed to the atmosphere. Such structures and tire architecture are well known to one having ordinary skill in the art and therefore, a detailed disclosure of such information is neither required nor proper.

The invention is further illustrated by the following example, which is to be regarded only as an illustration and not delimitative of the invention in any way.

Surface cracking was evaluated using a test closely related to the ASTM 1149-99 Standard Test Method for Rubber Deterioration entitled Surface ozone cracking in a chamber. The testing utilized in the examples that follow differs in the construction of the sample holder, which was a rod rather than a wooden block holder as required under the ASTM test method. Rectangular samples were cut with a die then folded in half and stapled such that the curvature of the loop has a maximum local strain of 18%.

These samples were hung on a rod for 2-5 days under ambient conditions before being placed in an ozone chamber. The ozone chamber conditions were set at 50 parts per hundred million ozone (pphm) and a temperature of 40° C. for three weeks. The samples were evaluated for cracks every week for three weeks. The samples were evaluated using the Rubber Deterioration Test Grades that consists of three numbers. The first number indicates the number of cracks in the sample, the second rates the width of the cracks and the third number is the depth of the crack. Zero indicates that no cracks were observed.

Surface cracking was also evaluated using the Trapeze test where cracking is determined after elongation of the sample. Samples under strain are more susceptible to cracking. Samples have a dogbone shape and were cut with a die and loaded into a V-shaped holder. The first slot of the holder corresponds to a 10% strain with each slot increasing in strain until a maximum of 150% strain is reached. The holder was fully loaded with fifteen samples and placed in the ozone chamber. The ozone chamber conditions were set at 50 parts per hundred million ozone (pphm) and a temperature of 40° C. for one day. The trapeze test results indicate the amount of elongation where the first cracks appeared. The larger number indicates a greater resistance to cracking.

Example 1

Elastomer formulations were prepared using the components shown in Table 1 and using procedures well known to one having ordinary skill in the art. The amount of each component making up the elastomer formulations shown in Table 1 are provided in parts per hundred weight (phr) of the elastomer. The antidegradant and curing package included typical amounts of antidegradants and curing compounds including TMQ, stearic acid, 6PPD, zinc oxide, sulfur and an accelerator as known to one having ordinary skill in the art.

The elastomer formulations were prepared by mixing the components given in Table 1, except for the oil, sulfur and accelerator, in a Banbury mixer operating at 55-65 RPM at a temperature of 50° C. The oil was introduced at 90° C. The piston was raised at 120° C. and again at 140° C. to allow the mix to turn over. Mixing continued until a temperature of 155° C. was reached. Sulfur and accelerator were then added to the mix on a roll mill. Vulcanization was effected at 150° C. for 20 minutes. The mixtures were formed into plaques and cured. Roughly square plaques were used for the Rubber Deterioration test. Rectangular, thicker plaques were used for the Trapeze testing.

The formulations were then tested as described above to measure cracking resistance with exposure to ozone. The results are shown in Table 1.

TABLE 1

Elastomer Formulations and Ozone Resistance Results

| Elastomer Composition | E1 | E2 | E3 | E4 | E5 | E6 | E7 | E8 |
|---|---|---|---|---|---|---|---|---|
| Elastomer (NR/BR) | 35/65 | 35/65 | 35/65 | 35/65 | 35/65 | 35/65 | 35/65 | 35/65 |
| Naphthenic oil | 20 | 20 | 20 | 20 | 20 | 20 | 20 | 20 |
| Carbon Black (carcass grade) | 50 | 50 | 50 | 50 | 50 | 50 | 50 | 50 |
| Antidegradant and Curing Package | 11 | 11 | 11 | 11 | 11 | 11 | 11 | 11 |
| Durazone 37 | 0.5 | 0 | 0.15 | 0.25 | 0.35 | 0.15 | 0.25 | 0.35 |
| Phenolic resin | 0 | 0.75 | 0 | 0 | 0 | 0.75 | 0.75 | 0.75 |
| Test Results | | | | | | | | |
| Rubber Deterioration grading scale | 0 | 1-1-0 | 1-1-0 | 0 | 0 | 0 | 0 | 0 |
| Trapeze % elongation | 70 | 30 | 20 | 20 | 50 | 50 | 30 | 60 |

The rubber elastomer formulations E1-E8 were made up of a 35/65 blend of natural rubber (NR) and butadiene rubber (BR).

The test results show that a combination of a phenolic resin and a particular antiozonant in low concentration as in formulation E6 perform as well as higher concentrations of antiozonant alone as in formulation E5 for ozone resistance.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A tire comprising a rubber structure, the rubber structure comprising:
    an essentially unsaturated rubber elastomer;
    an antiozonant consisting of between 0.1 and 0.45 phr of 2,4,6-Tris-(N-1,4-dimethyl-pentyl-p-phenylenediamino)-1,3,5-triazine; and
    between 0.5 and 2 phr of a phenolic resin.
2. The tire of claim 1, wherein the rubber structure is a sidewall.
3. The tire of claim 1, wherein the rubber structure is a tread.
4. The tire of claim 1, comprising:
    between 0.15 and 0.35 phr of the antiozonant.
5. The tire of claim 1, comprising:
    between 0.3 and 0.45 phr of the antiozonant.
6. The tire of claim 1, comprising:
    between 0.5 and 1.0 phr of the phenolic resin.
7. The tire of claim 1, wherein the rubber elastomer is a highly unsaturated rubber.
8. The tire of claim 1, wherein the rubber elastomer is selected from polybutadienes, polyisoprenes, natural rubber, butadiene copolymers, isoprene copolymers or mixtures thereof.
9. The tire of claim 1, wherein the rubber elastomer is selected from butadiene-styrene copolymers, butadiene-isoprene copolymers, isoprene-styrene copolymers and isoprene-butadiene-styrene copolymers.
10. The tire of claim 1, wherein the rubber elastomer is functionalized.
11. A rubber article, comprising:
    an essentially unsaturated rubber elastomer;
    an antiozonant consisting of between 0.1 and 0.45 phr of 2,4,6-Tris-(N-1,4-dimethyl-pentyl-p-phenylenediamino)-1,3,5-triazine; and
    between 0.5 and 2 phr of a phenolic resin.
12. The rubber article of claim 11, comprising:
    between 0.15 and 0.35 phr of the antiozonant.
13. The rubber article of claim 11, comprising:
    between 0.3 and 0.45 phr of the antiozonant.
14. The rubber article of claim 11, comprising:
    between 0.5 and 1.0 phr of the phenolic resin.
15. The rubber article of claim 11, wherein the rubber elastomer is a highly unsaturated rubber.
16. The rubber article of claim 11, wherein the rubber elastomer is selected from polybutadienes, polyisoprenes, natural rubber, butadiene copolymers, isoprene copolymers or mixtures thereof.
17. The rubber article of claim 11, wherein the rubber elastomer is selected from butadiene-styrene copolymers, butadiene-isoprene copolymers, isoprene-styrene copolymers and isoprene-butadiene-styrene copolymers.
18. The rubber article of claim 11, wherein the rubber elastomer is functionalized.
19. A dienic rubber composition, comprising:
    an essentially unsaturated rubber elastomer;
    an antiozonant consisting of between 0.1 and 0.45 phr of 2,4,6-Tris-(N-1,4-dimethylpentyl-p-phenylenediamino)-1,3,5-triazine; and
    between 0.5 and 2 phr of a phenolic resin.

20. The rubber composition of claim 19, comprising: between 0.15 and 0.35 phr of the antiozonant.

21. The rubber composition of claim 19, comprising: between 0.3 and 0.45 phr of the antiozonant.

22. The rubber composition of claim 19, comprising: between 0.5 and 1.0 phr of the phenolic resin.

23. The rubber composition of claim 19, wherein the rubber elastomer is a highly unsaturated rubber.

24. The rubber composition of claim 19, wherein the rubber elastomer is selected from polybutadienes, polyisoprenes, natural rubber, butadiene copolymers, isoprene copolymers or mixtures thereof.

25. The rubber composition of claim 19, wherein the rubber elastomer is selected from butadiene-styrene copolymers, butadiene-isoprene copolymers, isoprene-styrene copolymers and isoprene-butadiene-styrene copolymers.

26. The rubber composition of claim 19, wherein the rubber elastomer is functionalized.

* * * * *